United States Patent [19]

Oshima et al.

[11] 3,924,457

[45] Dec. 9, 1975

[54] MISFIRE DETECTING DEVICE FOR INTERNAL COMBUSTION ENGINE

[75] Inventors: Yujiro Oshima, Ichinomiya; Masao Kataoka, Nagoya; Osamu Tutui, Toyota; Noboru Shibayama, Nagoya; Masayoshi Ohtuka, Nagoya; Shigehito Ozaki, Nagoya, all of Japan

[73] Assignee: Kabushiki Kaisha Toyota Chuo Kenkyusho, Japan

[22] Filed: Mar. 28, 1974

[21] Appl. No.: 455,941

[30] Foreign Application Priority Data
Mar. 31, 1973 Japan.................................. 48-37328

[52] U.S. Cl.................................... 73/116; 73/117.2
[51] Int. Cl.²........................................ G01M 15/00
[58] Field of Search............ 73/116, 115, 117.3, 35, 73/389, 118, 119 R, 117.2

[56] References Cited
UNITED STATES PATENTS

| | | | |
|---|---|---|---|
| 2,112,570 | 3/1938 | Spacher | 73/117.3 UX |
| 2,766,616 | 10/1956 | Potter et al. | 73/118 |
| 3,216,244 | 11/1965 | Borchers | 73/115 |
| 3,244,006 | 4/1966 | Delmonte | 73/115 UX |
| 3,415,114 | 12/1968 | Crampton et al. | 73/117.2 |

*Primary Examiner*—Jerry W. Myracle
*Attorney, Agent, or Firm*—Oblon, Fisher, Spivak, McClelland & Maier

[57] ABSTRACT

A misfire detecting device for an internal combustion engine includes an exhaust gas introducing tube which comprises tube means having openings at both ends thereof, one opening thereof being provided at a portion adjacent to an exhaust port in an exhaust passage in order to introduce the exhaust gas from a combustion chamber of the internal combustion engine which is of the piston type and the other opening thereof being provided at an exterior portion of the exhaust passage. A pressure transducer having a pressure sensing part is connected to the said other opening of the exhaust gas introducing tube, thereby converting a pressure fluctuation of the exhaust gas introduced by said exhaust gas introducing tube to an electrical signal. A signal processing circuit electrically connected to said pressure transducer detects a predetermined signal from said electrical signal of said pressure transducer. Thus the misfire detecting device converts a flow fluctuation of the exhaust gas in the exhaust passage to an electrical signal with said pressure transducer, detects a portion of the pressure fluctuation based on a misfire of the internal combustion engine from said electrical signal and thereby detects a misfire of the internal combustion engine.

14 Claims, 7 Drawing Figures

MISFIRE DETECTING DEVICE FOR INTERNAL COMBUSTION ENGINE

BACKGROUND OF THE INVENTION

1. Field of the Invention

The present invention relates to a misfire detecting device for an internal combustion engine by which misfire and a misfire cycle in the various driving conditions of a piston type internal combustion engine can be detected with high accuracy and high response.

2. Description of the Prior Art

Various types of conventional misfire detectors are present in the prior art. While somewhat satisfactory, one problem is that all of the heretofor misfire detectors had a very slow response and low accuracy.

For example, one type of a conventional misfire detector detects misfire by measuring the temperature of the exhaust gas from the combustion chamber of an engine in the exhaust process with a temperature sensor such as a thermocouple or the like. It should be understood that the necessary time for one cycle of the engine is less than about 200m sec. even if a four cycle type engine is used. Thus, the response speed of the temperature sensor is more than several hundred m sec. in view of the practical use of such a type of misfire detector and therefore the temperature detection in response to the misfire cycle was very difficult. Furthermore, it should be understood that the exhaust gas temperature is widely changed by a change of driving conditions (engine load, engine speed), and since there is not a remarkable difference between the exhaust gas temperature in the case of normal combustion and that in the case of a misfire, the $S/N$ ratio is small. Accordingly, it is very difficult to detect misfire in the engine with high accuracy and high response.

Another type of the conventional misfire detectors detects misfire by analyzing the exhaust gas from the combustion chamber of the engine. Namely, when misfire occurs in an engine, carbon monoxide (CO) is decreased and hydrocarbon (HC) is increased, so misfire in the engine can be detected by means of detecting the content of carbon monoxide or of hydrocarbon in the exhaust gas of the engine. But the response speed of this type of detector is slow, namely the response time of this type analyzer is 1 to 3 seconds. In addition, the absolute value of the content of carbon monoxide and hydrocarbon in the exhaust gas is not constant because of the stroke volume, the type of internal combustion engine being employed, the engine load and the air-fuel ratio. Thus it was difficult to detect misfire in the engine with high response and with high accuracy.

Furthermore, other types of misfire detectors detect the number of times of misfire by measuring the cylinder pressure in the combustion chamber of the engine and by analyzing the pressure wave (the time history of the measured cylinder pressure). However in such detectors a very complex electronic circuit is required to electrically carry out the detection and it is troublesome for an experimenter to judge the pressure wave. Therefore it was very difficult to use such detectors to be mounted on the vehicle in a practical manner.

SUMMARY OF THE INVENTION

It is a primary object of the present invention to provide a new and improved unique misfire detecting device for an internal combustion engine which is simply constructed and by which a misfire condition can be detected with a high accuracy and a high response.

Another object of the present invention is to provide a new and improved unique misfire detecting device for an internal combustion engine by which a misfire condition can be detected with high accuracy and high response, independent of the driving conditions of the engine such as engine speed, load, air-fuel ratio and the like.

A further object of the present invention is to provide a new and improved unique misfire detecting device for an internal combustion engine which is inexpensive, compact, has excellent durability, and which is not only useful as a misfire detecting device for the adjustment or test of the engine, but also is applicable to be used on a vehicle as a sensor of the various controllers which are required to detect misfire of the engine in an automobile.

In arriving at the present invention it was realized that a pulsating inlet and exhaust gas flows in an inlet tube and in an exhaust pipe of an internal combustion piston type engine and that a complex change of their pressure based on change of time and location appears. More particularly, it could be anticipated that the mode of the pressure change is varied according to a misfire in the engine. Thus, the subject inventors measured the static pressure in the inlet pipe or the exhaust pipe and the result of this measurement was as follows. The static pressure in the inlet pipe or the exhaust pipe does not change remarkably by misfire of the engine, and would be easily affected by various driving conditions of the engine such as engine speed, engine load, air-fuel ratio and the like. Therefore the $S/N$ ratio was not good, and would be remarkably affected with the condition of the other cylinders in the case of a multi-cylinder engine. From the above studies and developments, the following conclusions were obtained.

Even if any combustion (normal combustion, abnormal combustion such as preignition, after burning or the like) occurs in the combustion chamber of a piston type internal combustion engine which effects the engine speed, engine load, air-fuel ratio and the like, it was found that the velocity and the flowing pattern of the exhaust gas flow passing through the exhaust port was not remarkably changed when the exhaust process after the combustion described above started. But, if a misfire occurred in the engine then the unburned gas passing through the exhaust port was merely pushed out to the exhaust passage from the combustion chamber by the pumping operation of the piston member in the exhaust process, and therefore the velocity thereof was much slower than the velocity of the exhaust gas at the burning cycle.

Thus, it was uniquely realized that a misfire in the engine could be detected by detecting the fluctuation of speed of the exhaust gas flow and the change of the flow condition of the exhaust gas flowing through the exhaust passage provided downstream of the exhaust port. Accordingly, a misfire detecting device for an internal combustion engine according to the present invention was developed by which a misfire in the engine could be detected with accuracy and high response by detecting the fluctuation of speed of the exhaust gas flow.

Briefly, in accordance with the present invention the foregoing and other objects are attained, in one aspect, by the provision of a misfire detecting device for an internal combustion engine which comprises an exhaust gas introducing tube having openings at both ends thereof, one opening thereof being disposed downstream of the exhaust port of the combustion chamber of a piston type engine in the exhaust passage so that the exhaust gas is introduced from one opening of the introducing tube, and the other opening thereof being disposed at the exterior of the exhaust passage. A pressure transducer having a pressure sensing part is connected to the other opening of the exhaust gas introducing tube, thereby converting the pressure fluctuation of the exhaust gas introduced by the exhaust gas introducing tube to an electrical signal. A signal processing circuit is electrically connected to the pressure transducer for detecting a predetermined signal from the electrical signal of the pressure transducer, thereby converting the flow fluctuation of the exhaust gas in the exhaust passage to the electrical signal with the pressure transducer, detecting that portion of the pressure fluctuation based on a misfire of the internal combustion engine from the electrical signal, and thereby detecting a misfire of the internal combustion engine.

The misfire detecting device of the present invention constructed as described above, detects the fluctuation flow of the exhaust gas exhausted to the exhaust passage as a fluctuation of the total pressure thereof; generates an electrical signal corresponding to the fluctuation thereof; processes the electrical signal; and generates only the signal component based on a misfire in the engine as a pulse signal. Thus, a misfire detecting device according to the present invention can detect a misfire condition of an engine with high accuracy and high response without influence by the driving conditions of the engine.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings, wherein.

DETAILED DESCRIPTION OF THE PREFERRED EMBODIMENTS

Figure 1:
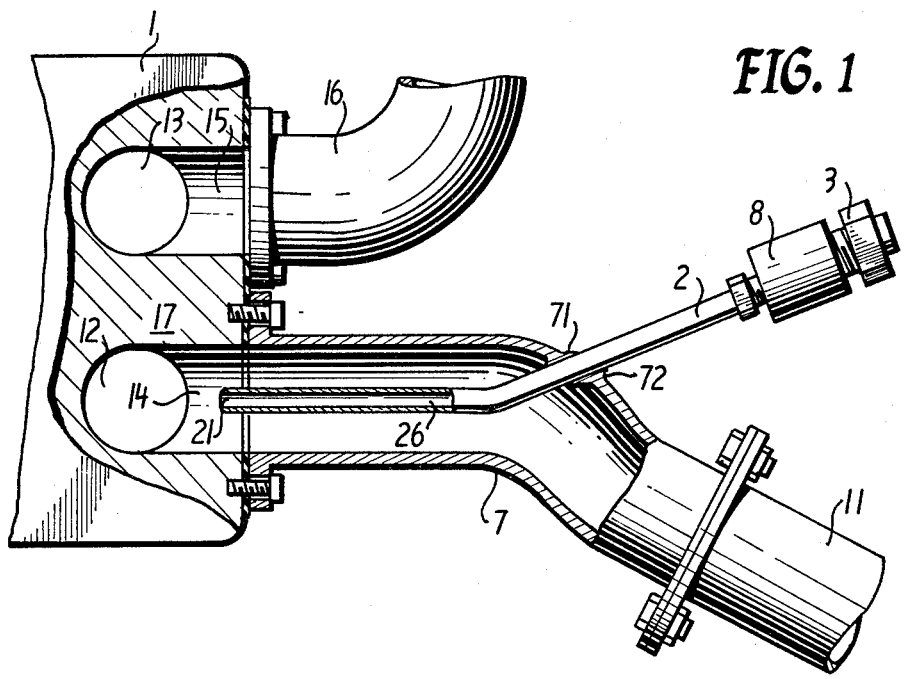
FIG. 1, shows a view in which the misfire detecting device for the internal combustion engine of the first embodiment according to the present invention is attached to the exhaust pipe of the engine.

Referring now to the drawings wherein like reference numerals refer to or designate identical or corresponding parts throughout the several views and more particularly to FIGS. 1-4 wherein a misfire detecting device for an internal combustion engine of a first preferred embodiment according to the present invention will be explained. The device for detecting misfire of a single cylinder spark ignition engine is mounted on a bench and is shown as including the essential elements of an introducing tube 2 as an exhaust gas introducing tube, a pressure transducer 3, a signal processing circuit 4, and a counter circuit 5 for counting the number of times of misfire in the engine.

In the first embodiment, a pipe 7 is inserted between the side wall of a cylinder block 17 of an internal combustion engine 1. The internal combustion engine 1 includes an intake pipe 16, and intake passage 15 an intake port 13, and an exhaust pipe 11, in order to dispose one opening thereof downstream of an exhaust valve 12 in an exhaust passage 14. The combustion chamber of the engine is connected to the exhaust pipe 11 through the exhaust valve 12 and the exhaust passage 14 of the cylinder block 17. A hole 72 of which the diameter is nearly equal to the outer diameter of the introducing tube 2 is made in a portion 71 of the peripheral wall of the pipe 7, and a part of the introducing tube 2 is inserted into the exhaust passage 14 in the cylinder block 17 downstream of the exhaust valve 12 of the internal combustion engine through the hold 72, and then is fixed to the pipe 7 at the portion 71 of the peripheral wall thereof with a welding means. As shown in FIG. 1, the introducing tube 2 is curved to be nearly an arced form, and it also may consist, by way of one example, of a stainless steel pipe of which the inner diameter is 6mm ($6\phi$), and the outer diameter is 8mm ($8\phi$). The stainless steel pipe of $6\phi$in inner diameter was selected in consideration of the unburned constituents or the like included in the exhaust gas. An introducing passage 27 of the tube 2 is formed within the pipe of $6\phi$in inner diameter, both ends of which are provided with openings. One opening 21 of the introducing tube 2 tapers so as not to disturb the exhaust gas flow in the exhaust passages 14. The opening 21 is disposed at a nearly central position of the exhaust passage 14 and by way of one example, approximately 10 cm downstream of the exhaust valve 12. The positioning of the opening 21 was determined by considering the reproducibility of the changes of the velocity of the flow, the flow condition of the exhaust gas, and the like based on the changes of the velocity of the flow, the flow condition thereof and the driving condition of the engine in the cases of burning and misfire cycles. The gas flow temporarily exhausted from the combustion chamber just backward of the exhaust valve 12 is remarkably disturbed and therefore the position at about 10 cm distance from the exhaust valve 12 is selected as the position of the opening 21, since the turbulence of the exhaust gas flow is almost smooth at that point, which is near the exhaust valve 12. The opening 21 of the introducing tube 2 is disposed at a nearly central position of the exhaust passage 14 because the velocity of the exhaust gas flow in the exhaust gas flow in the exhaust passage 14 is faster at the position located nearer to the axial center of the exhaust passage or the tube 7 and it is slower at the position located nearer to the peripheral of the wall. The other opening 22 of the introducing tube 2 is connected to the pressure transducer 3, which will be described hereinafter, in one body with the adapter 8 at the exterior of the exhaust passage 14. An annular member 23 is fixed in one body at the outer peripheral wall near the opening 22 of the introducing tube 2.

Figure 2:
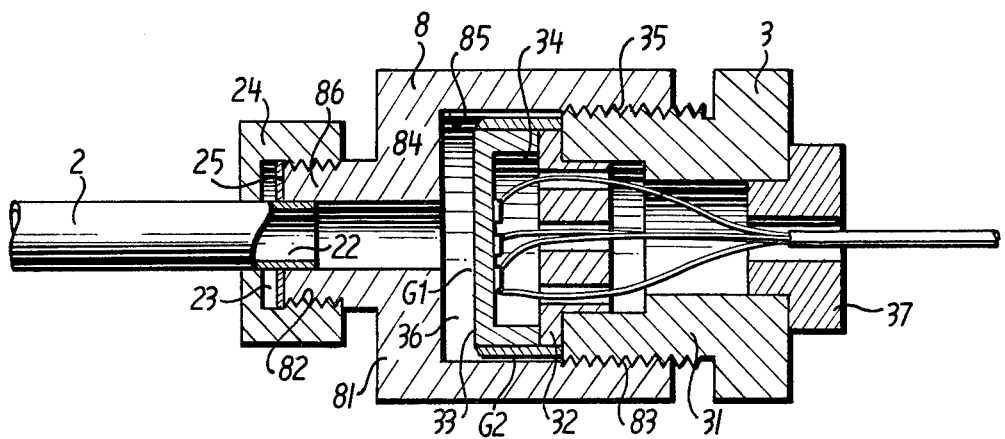
FIG. 2 is a cross-sectional view showing the composition of the introducing tube, the adapter and the pressure transducer of the misfire detecting device of the first embodiment according to the present invention.

As shown in FIG. 2, the adapter 8 comprises a cylindrical body provided with a shoulder part 81 and is coaxially disposed with perforated holes 84 and 85 the diameters of which are different from each other and which are mutually connected. An end part in the axial direction of the perforated hole 85 of the larger diameter is threaded to form the screw groove 83. A screw groove 82 is formed at the end part of the peripheral side wall of the adapter 8 disposed with the perforated hole 84 of the smaller diameter in the axial direction thereof. The opening 22 of the introducing tube 2 is inserted into the perforated hole 84 of the smaller diameter of the adapter 8. A ringshaped sealing spacer 25 is inserted between an end part 86 in the axial direction of the adapter 8 provided with the perforated hole 84 of the smaller diameter of the adapter 8 and the annular member 23 which is disposed in one body at the peripheral wall of the introducing tube 2. The annular member 23 is in contact with the end part 86 of the adapter 8 through the spacer 25. A connecting metal member 24 is employed to connect the introducing tube 2 with the adapter 8 in one body. The connecting metal member 24 is a hollow cylindrical body having a bottom part with a hole of nearly equal diameter to the outer diameter of the introducing tube 2 and which is perforated. Thus, intrducing tube 2 is inserted into the hole of the connecting metal member 24 at the opening 21 of the introducing tube 2 and the annular member 23 disposed at the other opening 22 of the introducing tube 2 is in contact with inside of the bottom part of the connecting metal member 24 as shown in FIG. 2. The end part of the connecting metal member 24 provided with the screw groove is fitted with the screw groove 82 formed at the end part 86 of the adapter 8 provided with the perforated hole 84 of the smaller diameter, and the connecting metal member 24 and the adapter 8 are fixed to each other so as to be closed.

In the pressure transducer 3, semiconductor strain sensing elements are used. This will be explained in more detail hereinafter with reference to FIGS. 2 and 3.

The numeral 31 refers to a cylindrical portion of the pressure transducer 3, and a washer 32 is fitted at the inner end of the cylindrical portion 31. At the washer 32, a flexible diaphragm 33 is fixed as the pressure sensing part. A reinforcement ring 34 is fixed at the outer peripheral surface of the diaphragm 33.

Two semiconductor strain sensing elements $G_1$, $G_2$, of mutually similar characteristics are attached to the inner surface of the flexible diaphragm 33. One strain sensing element $G_1$ is attached to the central part of the diaphragm 33 so as to detect a tensile stress generated by the flexibility of the diaphragm, and the other strain sensing element $G_2$ is attached so as to detect a compressive stress generated by the flexibility of the diaphragm 33.

Leads H, I, J, K, are respectively introduced outward from both ends of the semiconductor strain sensing elements $G_1$, $G_2$. The leads H, J, are introduced out of the pressure transducer 3 through a cap 37 fixed at the back part of the cylindrical portion 31 of the pressure transducer to connect with the terminals L, M respectively, and the leads I, K are connected with each other and introduced out of the pressure transducer to connect to the terminal M, in order to form a bridge circuit. More particularly, the terminals L, N are respectively connected to the plus and minus terminals of a D.C. power source, and a terminal N is connected to ground. On the other hand, the terminal M is used as the output terminal of the pressure transducer 3.

The outer diameter of the cylindrical portion 31 of the pressure transducer 3 is equal to the inner diameter of the perforated hole 85 which is the larger diameter of the perforated hole 8 to thereby form the casing of the pressure transducer. The pressure transducer 3 is inserted into the perforated hole 85 of the adapter 8, with external threads 35 thereon engaging internal threads 83 formed within the outer end of the perforated hole 85. At this time, a pressure receiving chamber 36 is determined by a shoulder part 81 provided in the adapter 8 between the perforated hole 84 and the hole or bore 85 of the larger diameter, and the flexible diaphragm 33 of thee pressure transducer 3 which is surrounded by the reinforcement ring 34. Heat is transmitted to the pressure transducer 3 from the engine 1 through the tube 7, the introducing tube 2 and the adapter 8, and transducer 3 is also heated with the exhaust gas through the flexible diaphragm, and therefore is formed to endure a temperature of about 200°C. The transducer 3 is also preferably designed to endure pressure greater than $2^{kg}/cm^2$ so that it can withstand abnormal increases in pressure in the rare case that fuel remains in the exhaust tube and is ignited.

Figure 3:
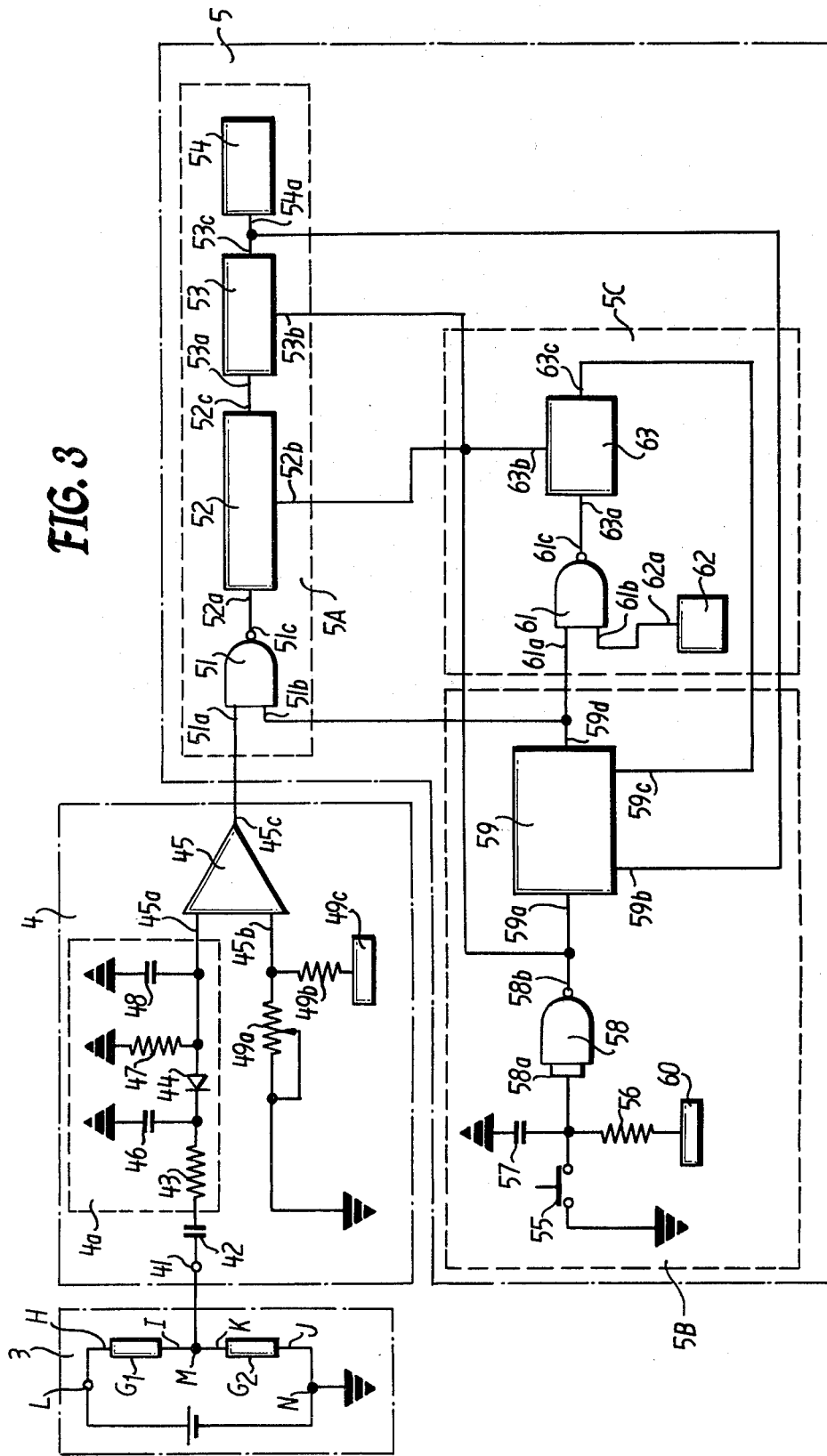
FIG. 3 shows the electrical circuits of the signal processing circuit and the counter circuit of the misfire detecting device of the first embodiment according to the present invention, respectively.

As shown in FIG. 3, the signal processing circuit 4 comprises an input terminal 41, capacitors 42, 46, 48, an input resistor 43, a diode 44, a resistor 47, a variable resistor 49a, an input resistor 49b and a comparator 45.

The input terminal 41 is connected to the output terminal M of the pressure transducer 3. One end of the capacitor 42 is connected to the input terminal 41 to exclude any D.C. component present in the signal from the pressure transducer 3. One end of the input resistor 43 is connected to the other end of the capacitor 42, and the other end of the resistor 43 is connected to the cathode terminal of the diode 44 and also to one side end of the capacitor 46 of which the other end is connected to ground. The anode terminal of the diode 44 is connected to input terminal 45a of the comparator 45.

Accordingly, only the negative component of the signal from the input resistor 43 is applied to the comparator 45 through the diode 44. With respect to the resistor 47 and the capacitor 48, one of each end is connected to ground, and the other ends thereof are connected in parallel to the circuit by which the diode 44 is connected with the comparator 45. A filter circuit 4a comprises the input resistor 43, the capacitors 46, 48, the resistor 47 and the diode 44. The other input terminal 45b of the comparator 45 is connected to the variable resistor 49a of which one end is connected to ground and the other one of which is connected to the input resistor 49b. The resistance 49b is of a predetermined resistance value and one end is connected to a source 49c for applying a constant minus voltage to the resistor 49b. Therefore, the output signal from the pressure transducer is applied to the comparator 45 through the input terminal 45a. The comparator 45 therefore generates a pulse signal only when the negative component voltage of the output signal from the pressure transducer 3 is smaller (greater, in the absolute value) than the voltage of the input signal applied to the other input terminal 45b, which voltage is determined by the predetermined voltage of the source 49c and the values of the variable resistor 49a and the input resistor 49b.

The counter circuit 5 comprises a counter circuit part 5A, a reset circuit part 5B and a time set circuit part 5C. The counter circuit part 5A comprises a gate circuit 51, a count display circuit 52, a first processing circuit 53 and an overflow display circuit 54.

The gate circuit 51 is an AND gate circuit which includes two input terminals 51a, 51b and an output terminal 51c. One input terminal 51a of the circuit 51 is connected to the output terminal 45c of the comparator 45 of the signal processing circuit 4. The gate circuit 51 applies the output signal from the comparator 45, which signal is applied to the input terminal 51a to the output terminal 51c when a signal is applied to the input terminal 51b (in the condition that the gate is on), but when a signal is not applied to the input terminal 51b (in the condition that the gate is off), it does not apply the output signal from the comparator 45 to the output terminal 51c. The count display circuit 52 comprises a flip-flop circuit and a digital display device, and one input terminal 52a thereof (the clock terminal of the flip-flop circuit) is connected to the output terminal 51c of the gate circuit 51 to count the number of pulse signals from the gate circuit 51 and to digitally display the counted number. In the display device, numbers from 0 to 99 are displayed, and the count display circuit generates a signal to the output terminal 52c when the number reaches 100. On the other hand, when a signal from the reset circuit part 5B, which will be described hereinafter, is applied to the other input terminal 52b (R - terminal of the flip-flop circuit), the value counted and displayed until to that time is cleared. The first processing circuit 53 is a D-type flip-flop circuit. The clock terminal 53a of the first processing circuit 53 is connected to the output terminal 52c of the count display circuit 52, while the R-terminal 53b thereof is connected to the reset circuit part 5B which will be described hereinafter. When a signal is applied to the clock terminal 53a from the count display circuit 52, a signal is generated from the output terminal 53c, but when a signal is applied to the R-terminal 53b from the reset circuit part 5B, then an output signal from the output terminal 53c is cleared. A lamp or an alarming buzzer is frequently employed for the overflow display circuit 54. In this embodiment, a lamp is employed therefor and the input terminal 54a thereof is connected to the output terminal 53c of the first processing circuit 53, and also to a second processing circuit 59 of the reset circuit part 5B which will be described hereinafter. When a signal is applied to the input terminal 54a, namely, when the counted number becomes more than the predetermined value (100 counts), the lamp is lighted.

The reset circuit part 5B is provided to reset respectively the counter circuit part 5A and the time set circuit part 5C which will be described hereinafter, and it comprises a switch 55, an input resistor 56, a capacitor 57 for preventing chattering, the inverter circuit 58, the second processing circuit 59 and a power source 60. The switch 55 is an on-off switch of the hand-operated type, and one end thereof is connected to the ground, and the other end is connected to the input terminal of the inverter circuit 58. One end of the input resistor 56 is connected to the power source 60 for applying a predetermined positive D.C. output voltage and the other end thereof is connected to the circuit by which the other end of the switch 55 is connected to the inverter circuit 58. One end of the capacitor 57 is connected to ground, and the other end thereof is connected to the circuit by which the other end of the input resistor 5b is connected to the input terminal 58a of the inverter circuit 58. The inverter circuit 58 comprises a transistorized integrating circuit, and the output terminal 58b thereof is connected to the other input terminal 52b of the count display circuit 52 of the counter circuit part 5A described above, and also to the R-terminal 53b of the first processing circuit 53. When a positive voltage signal is applied to the input terminal 58a of the inverter circuit 58, the signal is not generated from the output terminal 58b thereof, and when the positive voltage signal is not applied to the input terminal 58a, the signal is generated from the output terminal 58b. Therefore, when the switch 55 is "in the open condition", a signal is not generated from the output terminal 58b of the inverter circuit 58, because a positive voltage from the power source 60 is applied to the input terminal 58a of the inverter circuit 58.

On the contrary, when the switch 55 is "in the closed condition", a signal is generated from the output terminal 58b of the inverter circuit 58, because the voltage from the power source 60 is not applied to the input terminal 58a of the inverter circuit 58. The second processing circuit 59 is a D-type flip-flop circuit; wherein the S-terminal 59a is connected to the output terminal 58b of the inverter circuit 58, the R-terminal 59b is connected to the output terminal 54a of the first processing circuit 53 of the counter circuit part 5A, the clock terminal 59c is connected to the time set circuit part 5C which will be described hereinafter, and the output terminal 59d is connected to the other input terminal 51b of the gate circuit 51 of the counter circuit part 5A and to one input terminal 61a of a gate circuit 61 of the time set circuit part 5C which will be described hereinafter.

The second processing circuit 59 generates a signal from the output terminal 59d when a signal is applied to the S-terminal 59a, but when signals are applied to the R-terminal 59b and to the clock terminal 59c, it operates so as to clear the output signal generated from the output terminal 59d of the second processing circuit 59.

The time set circuit part 5C is provided to set the time to be measured, and it comprises the gate circuit 61, and oscillator 62 and an accumulator circuit 63. The gate circuit 61 is the same AND gate circuit as the gate circuit 51 explained in the case of the counter circuit part 5A, and one input terminal 61a thereof is connected to the second processing circuit 59d of the reset circuit part 5B. The oscillator 62 generates a clock pulse signal of a predetermined frequency by use of an astable multivibrator, and its output terminal 62a is connected to the other input terminal 61b of the gate circuit 61. The accumulator circuit 63 comprises a flip-flop circuit, the indicator for indicating the measured time and a selector circuit for measuring the period of time one input terminal 63a is connected to the output terminal 61c of the gate circuit 61, the other input terminal 63b is connected to the output terminal 58b of the inverter circuit 58 of the reset circuit part 5B, and also, the output terminal 63C is connected to the R-terminal 59b of the second processing circuit 59 of the reset circuit part 5B. The accumulator circuit 63 accumulates pulse signals from the gate circuit 61, and generates a signal from the output terminal 63c when the accumulated value reaches to the value corresponding to the predetermined measuring period of time. When a signal from the inverter circuit 58 is applied to the other input terminal 63b, the accumulated value is reset.

Hereinafter, the operation of the misfire detecting device of the first embodiment constructed as described above will be explained.

It is assumed that initially normal combustion is carried out in the single cylinder spark ignition engine 1 and that a misfire occurs at some time thereafter. When the combustion is normally carried out, an expanded burnt gas of high temperature and of high pressure is generated by explosion and combustion in the engine 1 and is exhausted toward the exhaust passage 14 from the exhaust valve 12 at the same time that the exhaust valve 12 is opened in the exhaust process. Thus, a gas flow of high pressure and of high speed is generated in the exhaust passage 14. On the other hand, when a misfire occurs in the engine 1, the explosion and combustion as described above is not carried out in the engine 1, and the exhaust gas is merely pushed to the exhaust passage 14 by the piston rising in the exhaust process. Accordingly, the pressure in the exhaust passage 14 is lowered, and a gas flow of low speed is generated therein. Therefore, both the static pressure and the dynamic pressure in the exhaust passage 14, just after the exhaust valve 12 is opened, are temporarily lower than those in the case of combustion. The opening 21 of the introducing tube 2 is disposed downstream of the exhaust valve 12 at the nearby central position therein. This opening 21 is opened toward the stream of the exhaust gas from the combustion chamber, so the total pressure consisting of the static pressure and the dynamic pressure of this exhaust gas is introduced to the introducing tube 2 and then it is conducted to the pressure receiving chamber 36 determined by the perforated hole 85 of the larger diameter of the adapter 8, the flexible diaphragm 33 and the reinforcement ring 34 of the pressure transducer 3 through the introducing passage 26 of the introducing tube 2, the opening 22 of the introducing tube 2 and the perforated hole 84 of the smaller diameter of the adapter 8. As shown in FIG. 2, the flexible diaphragm 33 of the pressure transducer 3 is disposed facing to the pressure receiving chamber 36.

Figure 4:
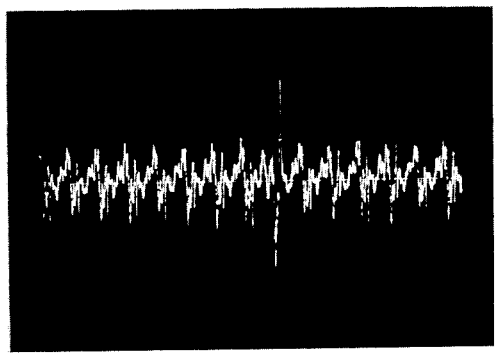
FIG. 4 is a photograph showing the output signal from the pressure transducer in the misfire detecting device of the first embodiment according to the present invention, when the misfire occurs in the engine.

When the normal combustion is carried out in the engine 1, the higher total pressure of the exhaust gas flow is intorduced into the pressure receiving chamber 36 by means of the pressure transmission, and when a misfire occurs in the engine, the lower total pressure of the exhaust gas flow is introduced into the pressure receiving chamber 36 by the same mode as described above. Therefore, the flexible diaphragm 33 of the pressure transducer 3 disposed in the pressure receiving chamber 36 detects the normal combustion as a high pressure, and also detects misfire as a low pressure. Thus, the electrical signal (voltage) shown in the photograph of FIG. 4 is generated from the pressure transducer 3 and the part in which the voltage is temporarily lowered shows the misfire condition. This electrical signal is generated from the output terminal M of the pressure transducer 3 to the signal processing circuit 4 connected to the transducer.

In the signal processing circuit 4, at first, the D.C. component of the electrical signal from the pressure transducer 3 is excluded by means of the capacitor 42, and then the signal component based on the combustion in the engine 1 is excluded by means of the filter circuit 4a comprising the input resistor 43, the capacitors 46, 48, the resistor 47 and the diode 44, because the time constant of the filter circuit 4a is selected to exclude and smooth the signal component based on the combustion in the engine 1 of the electrical signal from the pressure transducer 3 and to pass through only the pulse signal based on the misfire in the engine. Thus, only the pulse signals (the negative pulses) are applied to the input terminal 45a of the comparator 45. At this time the reference voltage determined by the minus constant voltage of the power source 49c, the values of the variable resistor 49a and the input resistor 49b (namely, the set voltage is lower than the signal component indicating the combustion condition is higher than the negative pulse signal indicating a misfire condition), is applied to the other input terminal 45b of the comparator 45, and therefore, when the negative pulse signal based on the misfire in the engine is applied to the input terminal 45a from the filter circuit 4a, the comparator 45 generates a pulse signal corresponding to the misfire condition from the output terminal 45c.

In the counter circuit 5, when the switch 55 of the reset circuit part 5B is in "the closed condition", a signal is applied to the other input terminal 51b of the gate circuit 51 from the output terminal 59d of the second processing circuit 59. Thus, the gate circuit generates a pulse signal whenever a pulse signal corresponding to the misfire condition is applied to one input terminal of the gate circuit 51 of the counter circuit part 5A from the comparator 45. The count display circuit 52 counts the number of pulse signals which correspond to the misfire condition, from the gate circuit 51, and it also digitally displays the number of these pulse signals with the display device. The count display circuit 52 supplies a signal to the first processing circuit 53, when the counted value becomes more than a predetermined value (100 counts). When a signal is applied to the input terminal 53a of the first processing circuit 53, the first processing circuit 53 generates a signal from the output terminal 53c to light a lamp of the overflow display circuit 54.

The reset circuit part 5B for resetting the counter circuit part 5A, and the time set circuit part 5C for setting the time to be measured will be explained. In the reset circuit part 5B, by switching over the switch 55 from "the closed condition" at the time when the measurement is started, the inverter circuit 58 is made to be from the condition that a positive voltage is applied to the input terminal 58a of the inverter circuit 58a of the inverter circuit 58 to the condition that a voltage is not applied, and it is again changed over to the condition that a voltage is applied. At the time when the inverter circuit 58 is converted so that the voltage is not applied to the input terminal 58a thereof, signals are generated from the output terminal 58b of the inverter circuit 58, and these signals are respectively applied to the second processing circuit 59 and to the respective R-terminals 52b, 53b of the count dispaly circuit 52 and the first processing circuit 53 of the counter circuit part 5A to reset the circuits 52 and 53. Also a signal from the output terminal 58b is applied to the input terminal 63b of the accumulator circuit 63 of the time set circuit part 5C so that the accumulated value in the accumulator circuit 63 is resetted. When a signal from the inverter circuit 58 is applied to the second processing circuit 59, the second processing circuit 59 supplies signals to the gate circuits 51 and 61.

In the time set circuit part 5C, a predetermined clock pulse signal is generated from the oscillator 62, and the signal from the second processing circuit 59, so that a clock pulse signal corresponding to that of the oscillator 62 is generated from the gate circuit 61. The clock pulse signal from the gate circuit 61 is accumulated by means of the accumulator circuit 63, and the accumulated value therein is displayed by the count display device 52. When the predetermined measuring period of time is reached, a signal is generated from the output terminal 63c, and the signal is applied to the second processing circuit 59 of the reset circuit part 5B so that the output signal of the second processing circuit 59 is cleared. Therefore, the respective gate circuits 51 and 61 become in "the gate-off condition", so that a signal is not generated from the output terminals 51c and 61c. Accordingly, the number times of misfire in the engine 1 during the predetermined measuring time can be obtained by means of recognizing the digital result of the count display circuit 52 in the counter circuit part 5A.

When the number of times of the misfire in the engine 1 during the predetermined measuring period of time becomes more than the predetermined value (100 counts), this situation, described above, is detected by the count display circuit 52 of the counter circuit part 5A, and a signal is applied to the first processing circuit 53 from the output terminal 52c, and at the same time, the signal from the first processing circuit 53 is applied to the second processing circuit 59 of the reset circuit part 5B. Thus, the respective gate circuits 51 and 61 are made to become in "the gate-off condition" as in the same manner described above.

It should now be apparant that the construction of the misfire detecting device for an internal combustion engine of the first preferred embodiment is very simple and comprises mainly the introducing tube 2, the pressure transducer 3 and the signal processing circuit 4. With this misfire detecting device, a misfire condition in the engine 1 is detected as the fluctuation of the total pressure of the exhaust gas in the exhaust passage, and a signal based on the misfire in the engine is generated from the pressure transducer 3 with a good S/N ratio, not being effected by the driving condition of the engine. Thus, a misfire condition in the engine 1 is able to be accurately detected. Further, since the distance between the opening 21 of the introducing tube 2 and the flexible diaphragm 33 of the pressure transducer 3 is a little over 10cm, the time required for the transmission of a pressure wave therebetween is at most only several hundred micro sec. This is the primary factor which enables a high response to be achieved in the misfire detecting device according to the present invention. Thus, the misfire detecting device according to the present invention has a high response compared with the conventional devices which had a low response of which the response time was in the order of a second or several hundred mm sec. Furthermore, the misfire detecting device according to the present invention can be inexpensively produced but also has excellent durability.

As to the pressure transducer 3 in the present device, since it is merely an electric pulse generator, complex regulation, zero-adjustment and the like are not required, nor is a high quality grade transducer required. In other words, an inexpensive pressure transducer may be employed if it can respond only to a transient fluctuation, such as misfire in an engine.

In the first embodiment according to the present invention, by adding the counter circuit 5 comprising the counter circuit part 5A, the reset circuit part 5B and the time set circuit part 5C, to the essential elements of the misfire detecting device, the counter circuit 5 being connected to the signal processing circuit 4 which is one of the essential elements thereof, the number of times of misfire in the engine during a predetermined measuring time can be digitally displayed in real-time. Also when the number of times of misfire in the engine 1 becomes over the predetermined number of times, a lamp of the overflow display circuit 54 is lighted to alarm one of the same.

Figure 6:
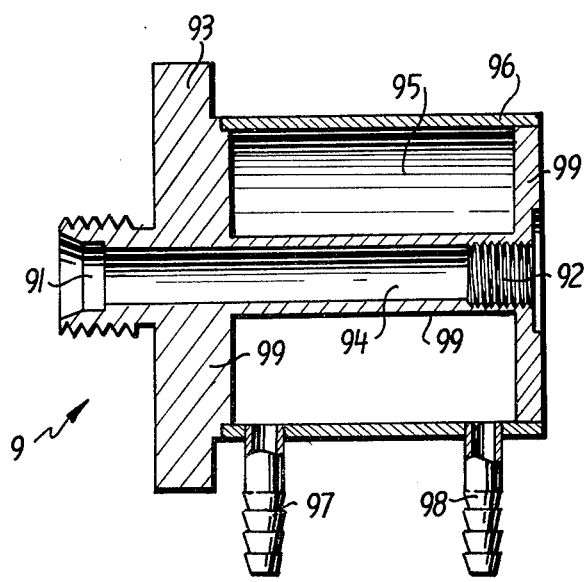
FIG. 6 is a cross-sectional view of the cooling adapter added to the misfire detecting device of the second embodiment.
Figure 7:
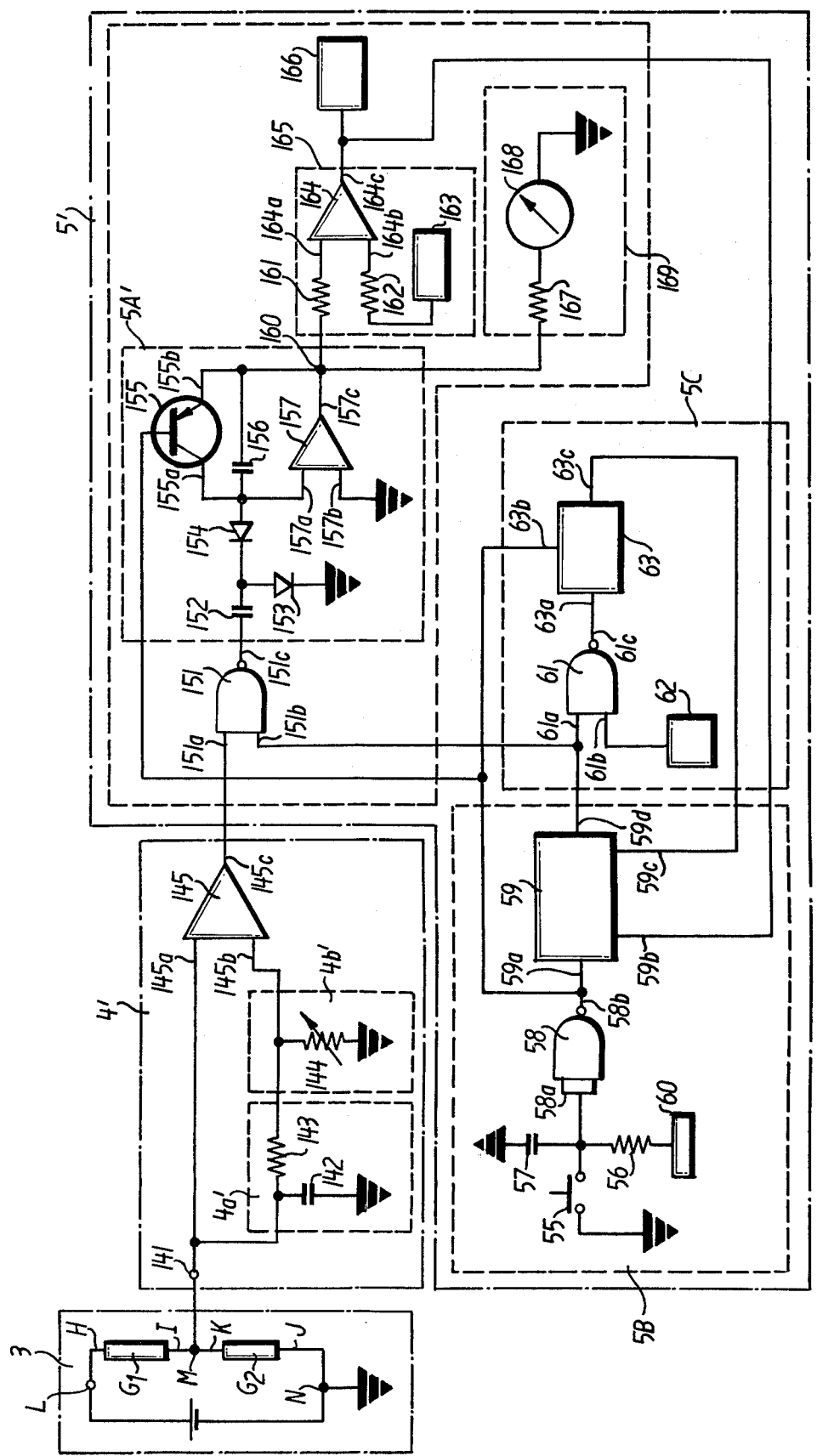
FIG. 7 is the electrical circuits of the signal processing circuit and the counter circuit of the misfire detecting device of the second embodiment, respectively.

Hereinafter, a second preferred embodiment according to the present invention will be explained with reference to FIGS. 5-7.

A misfire detecting device for an internal combustion engine of the second embodiment according to the present invention is a device for detecting the misfire condition in a multi-cylinder engine mounted on a vehicle and comprises an introducing tube 2', the pressure transducer 3, a cooling adapter 9, a signal processing circuit 4' and a counter circuit 5' for counting the number of times of misfire in the engine as the case of the first embodiment. The misfire detecting device of this second embodiment is attached to the multi-cylinder engine and the misfire condition of each cylinder is detected. Hereinafter, for the convenience of the explanation, this embodiment will be described with one cylinder as a typical example. The different points of the misfire detecting device of the second embodiment from that of the first embodiment are as follows: a connecting spacer 7' is employed for attaching this device to the engine, the cooling adapter 9 is employed, and the logic of the signal processing circuit is converted to analogly count the number of times of misfire and to display the result thereof with an analog display device. In the second embodiment, the parts other than the different points are the same as those of the first embodiment and the explanation of the same parts as those of the first embodiment will be omitted.

In the misfire detecting device for the internal combustion engine of the second embodiment according to the present invention, in order to dispose the introducing tube 2' at a predetermined position in the exhaust passage downstream of the exhaust valve, the connecting spacer 7' is provided on the exhaust pipe 11 in such a manner that the spacer 7' is inserted between the flange portions of the exhaust pipe 11 and fixed with bolts thereto and one end of the exhaust pipe 11 is fixed to the cylinder block (not shown in Figures). The connecting spacer 7' may be a ring-shaped member made of, for example, cast iron and the diameter of the inner wall 73 of the spacer 7' is equal to the inner diameter of the exhaust pipe 11. A plurality of holes 75 for inserting the bolts are formed at the flange part 74 of the spacer 7' along the axial direction thereof, and the hole 76 for inserting and fixing the introducing tube 2' from the outer wall of the spacer 7' to the inner wall along the radial direction thereof is formed toward the axial center thereof. The introducing tube 2' is fixed to the connecting spacer 7' beforehand, and the connecting spacer 7' is fixed to the predetermined position of the exhaust pipe 11 corresponding to the exhaust passage about 10 cm downstream of the exhaust valve of the engine.

Figure 5:
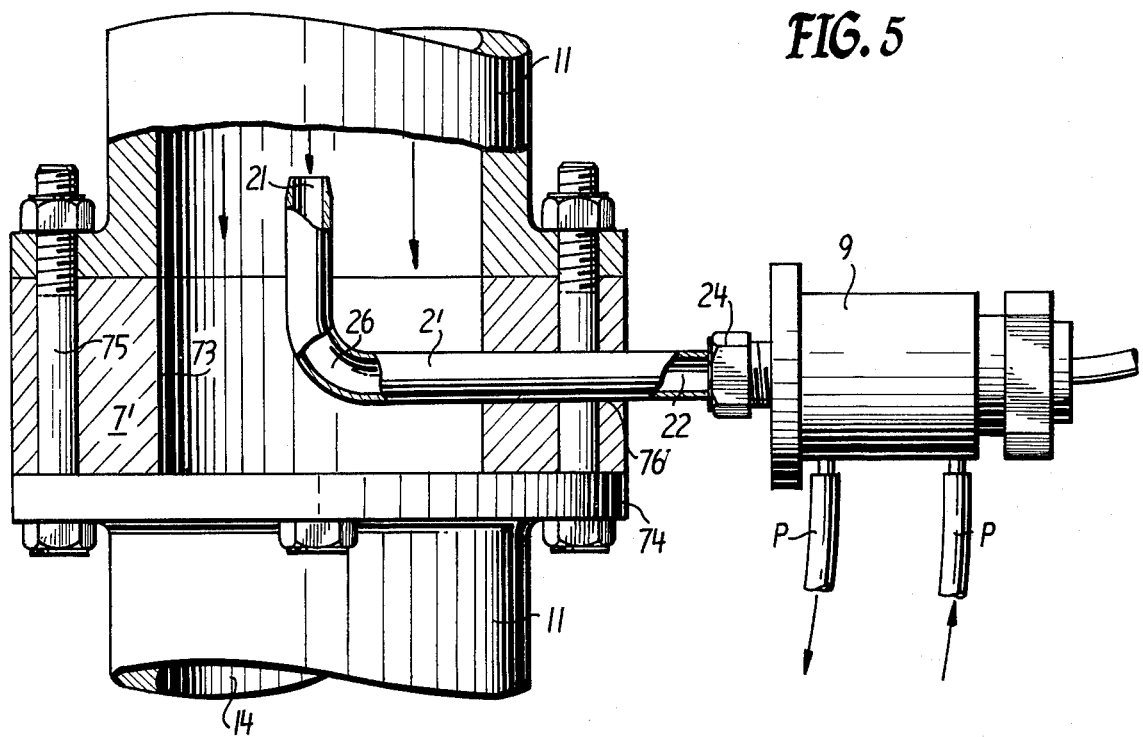
FIG. 5 shows a view in which the misfire detecting device for the internal combustion engine of a second embodiment according to the present invention, is attached to the exhaust pipe of the engine.

As shown in FIG. 5, the introducing tube 2' is a stainless steel pipe, is curved to be of an L-shape and may, for example, have an inner diameter of 6 mm and an outer diameter of 8 mm. Because the velocity of the exhaust gas flow in the exhaust pipe 11 is the faster at the position nearer to the axial center of the exhaust pipe and is slower at the position nearer to the peripheral wall thereof, for the same reasons as set forth in the first embodiment, the top end of the opening 21 of the introducing tube 2' is tapered similarly to that in the first embodiment. Further, the opening is disposed adjacent to the axial center of the exhaust pipe 11 and also at the exhaust passage about 10 cm downstream of the exhaust valve as the flow of the exhaust gas is violently disturbed just downstream of the exhaust valve. The other opening 22 of the introducing tube 2' is connected to the cooling adapter 9 with the connecting metal member 24 in the same manner as that of the first embodiment at the exterior of the exhaust pipe 11.

By means of the cooling adapter 9, the heat transmitted from the engine through the exhaust pipe 11, the connecting spacer 7' and the introducing tube 2' is cut off so that the heat from the engine is not transmitted to the pressure transducer 3, and simultaneously the pressure transducer 3 itself is cooled and also the exhaust gas in the cooling adapter is cooled. The adapter 9 is a double hollow cylinder having a thin inner wall and two flange portions 92 and 93 disposed at both ends thereof. The openings at both ends of the adapter 9 are interconnected through a connecting hole 94 provided in the adapter 9. This is cut from the outer side wall of adapter 9 toward the inner side wall thereof leaving only both end parts 91 including the flange 93 and 92 in the axial direction, and thus an annular groove 99 is formed along the outer periphery of the connecting hole 94. In addition, a screw groove fitting with the connecting metal member 24 is formed at the outer diameter part of one end part 91, and the inner diameter of the end part 91 is formed to be, for example, 8 cm which is the same as the outer diameter of the introducing tube 2. Another screw groove is formed at the inner diameter part of the other end part 92 in order to attach the pressure transducer 3. A thin rectangular metal plate 96 is attached along the outer periphery of both end parts by means of brazing so that the annular groove part 99 is sealed in a fluid tight condition. At the end parts of the thin rectangular metal plate 96 in the axial direction thereof, a hole 98 for introducing cooling water as a thermal medium and a hole 97 for emitting the same are disposed toward the axial center of the adapter 9. The pipes P for introducing and emitting the cooling water are connected to the introducing hole 98 and the emitting hole 97, respectively. These pipes P are connected to the circulating system of the engine cooling water of the multi-cylinder spark ignition engine. The engine cooling water is introduced into the introducing hole 98, the water is circulated in the cooling chamber 95 formed between the annular groove part 99 and the thin rectangular metal plate 96, and then it is emitted outside of the cooling adapter 9 through the emitting hole 97. The opening 22 of the introducing tube 2' is inserted into one end part 91 of the cooling adapter 9 and the introducing tube 2 is fixed in one body to the cooling adapter 9 with the connecting metal 24, thereby connecting the passage 26 of the introducing tube 2' and the connecting hole 94 of the cooling adapter 9.

The pressure transducer 3 is the same as that used in the first embodiment, and the screw groove 35 formed at the outer periphery of the cylindrical portion 31 of the pressure transducer 3 is engaged and fixed to the screw groove formed at the end part 92 of the cooling adapter 9, and thus the flexible diaphragm 33 of the pressure transducer 3 is disposed facing to the connecting hole 94 of the cooling adapter 9. Accordingly, a part of the exhaust gas from the engine is introduced to the surface of the flexible diaphragm of the pressure transducer 3 through the introducing passage 26, the opening 22 and the connecting hole 94 of the cooling adapter 9 from the opening 21 of the introducing tube 2', and therefore an electrical signal, in response to the pressure applied to the flexible diaphragm, is generated from the pressure transducer 3.

The construction of the signal processing circuit 4' is different from that of the signal processing circuit 4 in certain aspects as follows. The circuit 4' comprises an input terminal 141, a capacitor 142, an input resistor 143, a variable resistor 144 and a comparator 145. The signal processing circuit 4' of this embodiment is the same as the signal processing circuit 4 of the first embodiment with regard to the feature that it selects only a pulse signal based on a misfire and generates a signal indicative thereof, however it has the following features which are not provided by the first embodiment. More particularly, in the signal processing circuit 4' of this embodiment, an electrical signal from the pressure transducer 3 is applied to one input terminal of the comparator 145. The electrical signal from the pressure transducer 3 is also filtered through a filter circuit to generate a D.C. signal component and the voltage of the D.C. signal is controlled by means of a divider and then applied to the other input terminal of the comparator 145. The signals applied to both of the input terminals of the comparator are compared, thereby detecting a misfire condition in the engine and generating a pulse signal based on the misfire condition therein.

Hereinafter, the second embodiment according to the present invention will be explained in more detail. The input terminal 141 of the signal processing circuit 4' is connected to the M-output terminal of the pressure transducer 3 and it also is connected to one input terminal 145a of the comparator 145.

A capacitor 142 is connected to the circuit between the input terminal 141 of the circuit 4' and the input terminal 145a of the comparator 145, and the other end of the capacitor 142 is connected to ground. One end of the input resistor 143 is connected to one end of the capacitor 142, and the other end of the input resistor 143 is connected to the other input terminal 145b of the comparator 145. Thus the filter circuit 4'a comprises the capacitor 142 and the input resistor 143, and the electrical signal (the photograph thereof being shown in FIG. 4) from the pressure transducer 3 is converted to a D.C. signal by means of the filter circuit 4a'. One end of a variable resistor 144 is connected to the circuit between the other end of the input resistor 143 and the other input terminal 145b of the comparator 145, and the other end of the variable resistor 144 is connected to ground. Thus, a divider 4b' is formed. The voltage of the D.C. signal from the filter circuit 4a' is controlled with the divider 4b', and the signal so controlled is applied to the other input terminal 145b of the comparator 145. The comparator 145 may consist of an operational amplifier. The electrical signal from the pressure transducer 3 shown in FIG. 4 as the photograph is, as it is, applied to one side input terminal 145a of the comparator 145. Also, the electrical signal from the pressure transducer 3 is applied to the other input terminal 145b of the comparator 145 through the filter circuit 4a' and the divider 4b'. Namely, the signal from the pressure transducer 3 is converted to the DC signal by passing through the filter circuit 4a' and then the D.C. voltage signal is controlled to a predetermined voltage which is lower than the voltage of a signal component based on the combustion of the engine, and it is higher than the signal component based on a misfire thereof. Accordingly, it should be understodd that when the signal applied to the input terminal 145a is of a lower value than the signal applied to the other input terminal 145b, namely when the signal is indicative of a misfire, the comparator 145 generates a pulse signal based on the misfire in the engine.

The counter circuit 5' comprises the counter circuit part 5A' in which the pulse signal from the signal processing circuit 4' is analogly processed and the result is displayed with an analog display device. The reset circuit part 5B and the time set circuit part 5C are equal to those of the first embodiment described before. Hereinafter, only the counter circuit part 5A' will be explained.

The counter circuit part 5A' comprises a gate circuit 151, a memory circuit 159, a comparing circuit 165, a display circuit 169 and an overflow display device 166. The gate circuit 151 is an AND gate circuit. One input terminal 151a is connected to the output terminal 145c of the comparator 145 in the signal processing circuit 4' and the other input terminal 151b is connected to the second processing circuit 59 of the reset circuit part 5B in the same manner as in the first embodiment described before. The gate circuit 151 generates a negative pulse signal when signals are applied to both of the input terminals 151a and 151b, namely when "the gate is on" and a pulse signal based on a misfire is applied to the input terminal 151a. But when the signal is applied to only one of the input terminals 151a and 151b, the gate circuit 151 does not generate a signal.

The memory circuit 159 accumulates and memorizes the pulse signal from the gate circuit 151, and it comprises a coupling capacitor 152, diodes 153, 154, a transistor 155, a capacitor 156 and an operational amplifier 157. One end of the coupling capacitor 152 is connected to the output terminal 151c of the gate circuit 151, and the other end of the capacitor 152 is connected to the anode terminal of the diode 153 and to the cathode terminal of the diode 154. The cathode terminal of the diode 153 is connected to ground. The anode terminal of the diode 154 is connected with the collector 155a of the transistor 155 for switching on or off, to one end of the capacitor 156 and to the minus terminal 157a of the operational amplifier 157. The base 155c of the transistor 155 is connected to the output terminal of the inverter circuit 58 in the reset circuit part 5B, and the emitter 155b of the transistor 155 is connected to the other end of the capacitor 156 and to the output terminal 157c of the operational amplifier 157. Accordingly, the diode 153 passes through only a positive signal component, and the diode 154 passes through only a negative signal component, i.e., a negative pulse signal based on a misfire is applied to the capacitor 156 and to the minus terminal 157a of the operational amplifier 157. The capacitor 156 accumulates and memorizes the pulse signal based on the misfire generated from the diode 154 in response to the number of times of misfire in the engine. When the inverter circuit 58 of the reset circuit part 5B generates a signal, the transistor 155 is switched on and then the charge held in the capacitor 156 is cleared.

The comparing circuit 165 comprises input resistors 161, 162, a D.C. power source 163 and a comparator 164. One end of the input resistor 161 of the comparing circuit 165 is connected to the output terminal of the operational amplifier 157 of the memory circuit 159 through a terminal 160, and the other of the resistor 161 is connected to one input terminal 164a of the comparator 164. The D.C. power source 163 generates a predetermined positive D.C. voltage corresponding to the predetermined number of times of misfire in the engine, which voltage is connected to the other input terminal 164b of the comparator 164 through the input resistor 162. The output terminal 164c of the comparator 164 is connected to the overflow display circuit 166 which will be described hereinafter and to the second processing circuit 59 of the reset circuit part 5B. The comparator 164 generates a signal when the signal applied to the input terminal 164a is larger than the signal applied to the other input terminal 164b, namely when the number of times of misfire in the engine becomes over a predetermined number of times of misfire. The overflow display device 166 employs the same lamp as that employed in the first embodiment. In this embodiment, the lamp may be disposed at the dashboard of the vehicle and when a misfire in the engine is over the predetermined number of times, the comparator 165 generates a signal to light the lamp. Thus, a misfire in the engine can be informed to the driver.

The display circuit 169 comprises an input resistor 167 and an amperemeter 168 and is provided with a count scale on the displaying part thereof. One end of the input resistor 167 is connected to the output terminal 157c of the operational amplifier 157 of the memory circuit 159, and the other end of the resistor 167 is connected to one end of the amperemeter 168. Also the input resistor 167 is serially connected to the amperemeter 168. The other end of the amperemeter 168 is connected to ground, and the number of times of misfire in the engine is analogly displayed by the meter needle at the displaying part thereof, based on the current value corresponding to the voltage signal memorized in the memory circuit 159 in response to the number of times of misfire in the engine.

The reset circuit part 5B and the time set circuit part 5C are constructed in the same manner as in the first embodiment, so the explanation thereof will be omitted herein.

The operation of a misfire detecting device for an internal combustion engine of the second embodiment according to the present invention of which the construction is as described above, will be explained hereinafter.

It is assumed that a misfire occurs in some cylinder of the multicylinder spark ignition engine when the vehicle is driving. When a normal combustion is carried out, the expanded burnt gas of high temperature and of high pressure generated by explosion and combustion in the expansion process is exhausted into the exhaust passage 14 at the same time that the exhaust valve is opened. Thus, the velocity of the exhaust gas flow in the exhaust passage 14 is fast, and also is of a high pressure. On the other hand, when a misfire occurs in the engine, the unburned gas in the cylinder is merely pushed out by the rising of the piston in the exhaust process, so the velocity of the exhaust gas flow in the exhaust passage becomes slow and its pressure becomes low.

The misfire detecting device of the second embodiment according to the present invention detects a misfire in the engine by detecting a fluctuation of the exhaust gas flow in the exhaust passage 14 when a misfire occurs in the engine as the fluctuation of a pressure in the same manner as the first embodiment according to the present invention. More particularly, the exhaust gas from the engine is partially introduced from the opening 21 of the introducing tube 2 to the pressure receiving surface of the flexible diaphragm of the pressure transducer 3 through the passage 26 of the introducing tube 2, the opening 22 thereof, the connecting hole 94 of the cooling adapter 9, and thus a voltage signal is generated from the terminal M of the pressure transducer 3 in response to the fluctuation of the pressure based on the fluctuation of the exhaust gas flow in the exhaust passage. As a result, the signal shown in FIG. 4 employed in the first embodiment is generated.

In the signal processing circuit 4, the signal from the pressure transducer 3, is applied to one input terminal 145a of the comparator 145. On the other hand, the same signal as that from the pressure transducer 3 is converted to a D.C. signal with the filter circuit 4a', and is controlled to a predetermined voltage with the divider 4b'. The controlled signal is then applied to the other input terminal 145b of the comparator 145. The comparator 145 compares the signals from the input terminal 145a and the input terminal 145b to generate a pulse signal only when a misfire occurs in the engine.

The counter circuit 5' operates as follows. The memorized signal stored in the memory circuit is reset by the reset circuit part 5B, and the measuring time period to detect a misfire is set by means of the time setting circuit part 5C. Additionally, by means of the counter circuit 5A', the pulse signal generated from the signal processing circuit 4' is accumulated and memorized in the memory circuit 159 every time a misfire occurs, and the memorized signal is analogly displayed by moving (oscillating) the meter needle of the displaying part of the display device 169 in response to the number of times of misfire in the engine. If the number of times of the misfire in the engine, within the predetermined measuring time, is over a predetermined value, then the comparator 165 will detect an overflow and generate a signal to light the lamp of the overflow display device 166 which may be disposed at the dashboard of a vehicle. Thus an abnormal condition based on a misfire in the engine can be informed to the driver.

As should now be apparent from the description above, the misfire detecting device for the engine of the second preferred embodiment comprises the introducing tube 2', the pressure transducer 3, the cooling adapter 9 and the signal processing circuit 4' in the same manner as in the first embodiment. In the misfire detecting device of this second embodiment, a signal based on the misfire in the engine is generated from the pressure transducer 3 with good S/N ratio without being affected by the driving condition of the engine, by detecting the misfire condition in the engine of the vehicle as a fluctuation of the total pressure of the exhaust gas in the exhaust passage of the exhaust pipe. Thus, the device of the second embodiment can detect a misfire with high accuracy and high response. In the second embodiment, the cooling adapter 9 is added for the protection of the pressure transducer 3, so that it is not necessary to select a pressure transducer of excellent heat resistance, and also the durability of the pressure transducer 3 can be improved. The construction of the signal processing circuit 4' is very simple compared with that of the first embodiment, and thereby still further lowers the circuit cost and eliminates the need for a power source.

Thus the misfire detecting device of this embodiment has many excellent advantages as a misfire detecting device for mounting on a vehicle.

In the first and second embodiments described, examples have been given applying the misfire detecting device according to the present invention to a single cylinder engine and a multi-cylinder engine, but it should be understood that the present invention is not limited to these particular embodiments. For example, the introducing tube may be disposed in the exhaust passage of each cylinder of the multi-cylinder engine to detect a misfire condition in each cylinder. Also, the introducing tube may be disposed in the collective passage of the exhaust pipe of the multi-cylinder engine to detect a fluctuation of the exhaust gas flow exhausted from each cylinder. As a result thereof, it is also able to detect at which cylinder a misfire occurs by measuring the timing of the ignition signal (the ignition time) of each cylinder.

It should be understood further that the misfire detecting device which is applicable to piston type engines is not limited to the reciprocating engine described in the present embodiments, but it may be applied to the rotary type engine (such as the Wankel Engine) including a rotary piston. Moreover, it should be understood that the misfire detecting device of the present invention is not limited to the stroke ignition method described in the embodiments, but is also applicable to compressed ignition (self ignition) or to the hot bulb method. Thus, the misfire detecting device of the present invention can be readily applied to a Diesel engine and a hot bulb engine. Also, the present invention may be applied to either a 4-cycle type engine or a 2-cycle type engine. Additionally, various engines are classified by the combustion mode, the fuel supplying method, the air introducing method, the cooling method and the like, but if the engine is of the internal combustion piston type, the misfire detecting device according to the present invention is applicable.

It should be understood that with respect to a suitable material for the introducing tube 2 in the present embodiments, while a stainless steel pipe (8$\phi$, 6$\phi$) was explained as a material for the introducing tube 2 other materials, sizes and forms may be employed corresponding to the engine applicable to the present invention. Also, in the present embodiments, while the pressure transducer was connected by means of employing the adapter 8, it will be apparent that the adapter 8 is not always necessary and the pressure transducer itself may be included as the adapter part at one end.

Moreover, in the present embodiments, a flexible diaphragm with semiconductor strain gauges has been described as suitable as the pressure transducer 3, but obviously other pressure transducers of any type and size may be employed, so long as the same can respond to a transient change such as a misfire cycle of an engine, and so long as an electrical output corresponding to the pressure change of an exhaust gas of an engine can be obtained with the transducer. For example, a pressure transducer using piezoelectric elements, a pressure transducer with various strain gauges, a potentiometer, a differential transformer, a pressure transducer in which the principles of an induction coil is applied, and the like can be employed in accordance with the teachings of the present invention.

With respect to the signal processing circuit, while two examples were explained in the first and second embodiments respectively, it should be clear that any type of circuit construction can be used so long as it processes the output signal from the pressure transducer and generates a pulse signal of only the signal component based on a misfire in the engine.

In the present embodiments, the misfire detecting device was explained using a counter circuit, however obviously, the counter circuit is not an essential element of the present invention and has been added merely to count and display the number of times of misfire in an engine.

Accordingly the present invention relates to a misfire detecting device for an internal combustion engine, which comprises an introducing tube disposed downstream of the exhaust part of a piston type internal combustion engine in the exhaust passage, facing to the flow of the exhaust gas, the other opening thereof being disposed at an external (exterior) portion of the exhaust passage; a pressure transducer, the pressure sensing part thereof being faced to the other opening of the introducing tube, to introduce a part of the exhaust gas from the engine to a pressure receiving chamber through the introducing tube 2, thereby generating an electrical signal corresponding to the fluctuation of the pressure operating on the pressure sensing part of the transducer; and a signal processing circuit to process the signal from the pressure transducer to extract only the signal component based on misfire in the engine and to generate a pulse signal corresponding to the signal component. With the misfire detecting device of the present invention, a misfire condition in a piston type engine can be detected with high accuracy and high response without affecting the driving condition of the engine.

The misfire detecting device of the present invention is simply constructed, so it is inexpensive and compact and has excellent durability. Also, in an automobile comprising a piston type engine as the power plant, it is useful as a misfire detecting device which can be employed as the sensor of the various control devices for detecting a misfire condition of the engine. For example, when an abnormal misfire occurs in the engine, the driver may be instantly alarmed by an alarm display lamp which is lit with the output of the signal processing circuit and which is disposed at the instrument panel of the dashboard of the vehicle. Thus, one is able to prevent the vehicle from continuing to be driven while a harmful gas due to unburning of the fuel based on the misfire in the engine is exhausted. Moreover, such preventions are effective in view of the public benefit eliminated by not having such harmful gases placed in the public domain.

Obviously, various additional changes may be carried out in the present invention without departing from the spirit and scope of the invention as defined in the following claims.

What is claimed as new and desired to be secured by Letters Patent of the United States is:

1. A misfire detecting device for an internal combustion engine, comprising:
   an exhaust gas introducing tube comprising tube means having openings at the both ends thereof, one opening thereof being provided at a portion adjacent to an exhaust port in an exhaust passage in order to introduce the exhaust gas from a combustion chamber of the internal combustion engine which is of a piston type and the other opening being provided exterior of the exhaust passage,
   a pressure transducer having a pressure sensing part connected to said other opening of said exhaust gas introducing tube; thereby converting a pressure fluctuation of the exhaust gas introduced by said exhaust gas introducing tube to an electrical signal,
   a signal processing circuit electrically connected to said pressure transducer for detecting a predetermined signal from said electrical signal of said pressure transducer,
   a counter circuit connected to said signal processing circuit for counting the number of times of misfire of the internal combustion engine in a predetermined time period,
   whereby the flow fluctuation of the exhaust gas in the exhaust passage is converted to the electrical signal with said pressure transducer for detecting a portion of the pressure fluctuation based on a misfire of the internal combustion engine from said electrical signal, and thereby enabling the misfire of the internal combustion engine to be detected.

2. A misfire detecting device according to claim 1, wherein said counter circuit is a means for counting the number of times of misfire of the internal combustion engine and for displaying the counted number by a digital display.

3. a misfire detecting device according to claim 1, wherein said counter circuit is a means for counting the number of times of misfire of the internal combustion engine and for displaying the counted number by an analog display.

4. A misfire detecting device for an internal combustion engine, comprising:
   an exhaust gas introducing tube comprising tube means having openings at the both ends thereof, one opening thereof being provided at a portion adjacent to an exhaust port in an exhaust passage in order to introduce the exhaust gas from a combustion chamber of the internal combustion engine which is of a piston type and the other opening being provided exterior of the exhaust passage,
   a pressure transducer having a pressure sensing part connected to said other opening of said exhaust gas introducing tube; thereby converting a pressure fluctuation of the exhaust gas introduced by said exhaust gas introducing tube to an electrical signal,
   a signal processing circuit electrically connected to said pressure transducer for comparing a predetermined reference voltage and said electrical signal from said pressure transducer,
   whereby the flow fluctuation of the exhaust gas in the exhaust passage is converted to the electrical signal with said pressure transducer for detecting a portion of the pressure fluctuation based on a misfire of the internal combustion engine from said electrical signal, and thereby enabling the misfire of the internal combustion engine to be detected.

5. A misfire detecting device according to claim 4, further comprising a cooling adapter equipped to said pressure transducer, for cooling said pressure transducer with a predetermined thermal medium, thereby preventing said pressure transducer from overheating.

6. A misfire detecting device according to claim 5, wherein said cooling adapter comprises a double hollow cylinder having a thin inner wall, an annular chamber formed between said thin inner wall and an outer wall having two perforated holes in order to circulate said thermal medium therein, and two flange portions disposed at both ends to connect said inner and outer walls, said adapter being interposed between said exhaust gas introducing tube and said pressure transducer and a central hole surrounded by said inner wall being connected to the other opening of the exhaust gas introducing tube and the pressure sensing part of the pressure transducer.

7. A misfire detecting device according to claim 4 wherein said pressure transducer comprises a flexible diaphragm as said pressure sensing part and at least one strain sensing element attached to said flexible diaphragm to detect the misfire of the internal combustion engine.

8. A misfire detecting device according to claim 4, wherein:
said exhaust gas introducing tube is a stainless steel pipe disposed to penetrate an exhaust pipe of the internal combustion chamber, one opening of said exhaust gas introducing tube being disposed at a nearly central position of the exhaust passage and about 10 cm downstream of an exhaust valve of the internal combustion engine,
said pressure transducer comprises a casing comprising a hollow cylinder connected to the other opening of said gas introducing tube with an adapter, a cylinder member fixed to said casing, a flexible diaphragm attached to said cylinder member, two semiconductor strain sensing elements having mutually similar characteristics and being attached to an inside surface of said flexible diaphragm and being connected to a D.C. source in such a manner as to form a bridge circuit,
said signal processing circuit comprises a comparator, a filter circuit which is connected to one input terminal of said comparator and which comprises two resistors, two condensers and a diode, a condenser connected to an output terminal of said bridge circuit of said pressure transducer and to said resistor of said filter circuit, and a circuit which is connected to the other input terminal of said comparator and which comprises a source, a resistor and a variable resistor.

9. A misfire detecting device according to claim 8, further comprising:
a counter circuit comprising a counter circuit part connected to sais signal processing circuit,
a reset circuit part connected to said counter circuit part and,
a time set circuit part connected to said counter circuit part and said reset circuit part,
said counter circuit part comprising a gate circuit connected to said comparator of said signal processing circuit, a count display circuit connected to said gate circuit, a first processing circuit connected to said count display circuit, and an overflow display circuit connected to said first signal processing circuit,
said reset circuit part comprising a switch, a capacitor connected to said switch, an input resistor connected to said capacitor, a power source connected to said input resistor, an inverter circuit connected to said capacitor, input resistor, said count display circuit and said first processing circuit of said counter circuit part, and a second processing circuit connected to said inverter circuit, said gate circuit and an overflow display circuit of said counter circuit part,
said time set circuit part comprising a gate circuit connected to said second processing circuit of said reset circuit part, an oscillator connected to said gate circuit and an accumulator circuit connected to said gate circuit, said count display circuit and first processing circuit of said counter circuit part, and said second processing circuit of said reset circuit part.

10. A misfire detecting device for an internal combustion engine, comprising:
an exhaust gas introducing tube comprising tube means having openings at the both ends thereof, one opening thereof being provided at a portion adjacent to an exhaust port in an exhaust passage in order to introduce the exhaust gas from a combustion chamber of the internal combustion engine which is of a piston type and the other opening being provided exterior of the exhaust passage,
a pressure transducer having a pressure sensing part connected to said other opening of said exhaust gas introducing tube; thereby converting a pressure fluctuation of the exhaust gas introduced by said exhaust gas introducing tube to an electrical signal,
a signal processing circuit electrically connected to said pressure transducer for comparing a constant voltage obtained by signal processing said electrical signal from said pressure transducer, and said electrical signal from said pressure transducer,
whereby the flow fluctuation of the exhaust gas in the exhaust passage is converted to the electrical signal with said pressure transducer for detecting a portion of the pressure fluctuation based on a misfire of the internal combustion engine from said electrical signal, and thereby enabling the misfire of the internal combustion engine to be detected.

11. A misfire detecting device according to claim 10, wherein said exhaust gas introducing tube is an L-shaped stainless steel pipe disposed in the exhaust passage with a connecting spacer of an annular member, one opening of said exhaust gas introducing tube being disposed at a nearly central position of the exhaust passage and about 10 cm downstream of an exhaust valve of the internal combustion engine,
said pressure transducer comprises a casing comprising a hollow cylinder, a cylinder member fixed to said casing, a flexible diaphragm attached to said cylinder member, two semiconductor strain sensing elements having mutually similar characteristics and being attached to the inside surface of said flexible diaphragm and being connected to a D.C. source in such a manner as to form a bridge circuit,
said signal processing circuit comprises a comparator of which one input terminal is connected to an output terminal of said bridge circuit of said pressure transducer, a filter circuit comprising a condenser connected to said output terminal and a resistor connected to said condenser, and a divider connected to said resistor of said filter circuit and the other input terminal of said comparator.

12. A misfire detecting device according to claim 11, further comprising:
a counter circuit comprising a counter circuit part connected to said signal processing circuit, a reset circuit part connected to said counter circuit part, and a time set circuit part connected to said counter circuit part and said reset circuit part, said counter circuit part comprising a gate circuit connected to said comparator of said signal processing circuit, a memory circuit having a coupling capacitor connected to said gate circuit, two diodes, a transistor, a capacitor and an operational amplifier connected to said gate circuit, a comparing circuit having a first input resistor connected to said operational amplifier and a second input resistor, a power source and a comparator connected to said first and second input resistors, a display circuit having an input resistor connected to said operational amplifier and an amperemeter and an overflow display device connected to said comparator, said reset circuit part comprising a switch, a capacitor connected to said switch, an input resistor connected to said capacitor, a power source connected to said input resistor, an inverter circuit connected to said capacitor input resistor and said transistor of said memory circuit of said counter circuit part and a processing circuit connected to said inverter circuit, and said comparator of said comparing circuit of said counter circuit part, and said time set circuit part comprising a gate circuit connected to said processing circuit of said reset circuit part, an oscillator connected to said gate circuit, and an accumulator circuit connected to said gate circuit, said inverter circuit and said processing circuit of said reset circuit part.

13. A misfire detecting device for an internal combustion engine of the piston type comprising:

an exhaust gas introducing tube comprising tube means having openings at both ends thereof one opening thereof being provided in an exhaust passage sufficiently downstream of the exhaust port to a position where the exhaust gas flow is substantially smooth in order to introduce the exhaust gas from a combustion chamber of the internal combustion engine and the other opening being provided exterior of the exhaust passage, a pressure transducer having a pressure sensing part connected to said other opening of said exhaust gas introducing tube to convert a pressure fluctuation of the exhaust gas introduced by said exhaust gas introducing tube to an electrical signal, and a signal processing circuit electrically connected to said pressure transducer for receiving the electrical signal of said pressure transducer to detect the portion of the pressure fluctuation due to a misfire of the internal combustion engine to thereby detect the misfire of the internal combustion engine.

14. A misfire detecting device according to claim 13 further comprising a cooling adapter having an annular cooling chamber forming a cylindrical wall member, the annular cooling chamber being filled with a predetermined thermal medium and being interposed between said pressure transducer and said gas introducing tube for cooling both said pressure transducer and the exhaust gas in a portion surrounded by said annular cooling chamber with said predetermined thermal medium to prevent said pressure transducer from overheating.

* * * * *